(12) United States Patent
Venkataraman et al.

(10) Patent No.: US 11,978,475 B1
(45) Date of Patent: May 7, 2024

(54) SYSTEMS AND METHODS FOR DETERMINING A NEXT ACTION BASED ON A PREDICTED EMOTION BY WEIGHTING EACH PORTION OF THE ACTION'S REPLY

(71) Applicant: WELLS FARGO BANK, N.A., San Francisco,, CA (US)

(72) Inventors: Vinothkumar Venkataraman, Bangalore (IN); Rahul Ignatius, Bangalore (IN); Renuka Mannem, Andhra (IN); Naveen Gururaja Yeri, Bangalore (IN); Paul Davis, Irving,, TX (US)

(73) Assignee: Wells Fargo Bank, N.A., San Francisco, CA (US)

( * ) Notice: Subject to any disclaimer, the term of this patent is extended or adjusted under 35 U.S.C. 154(b) by 327 days.

(21) Appl. No.: 17/446,925

(22) Filed: Sep. 3, 2021

(51) Int. Cl.
*G10L 25/63* (2013.01)
*G06N 3/02* (2006.01)
(Continued)

(52) U.S. Cl.
CPC .............. *G10L 25/63* (2013.01); *G06N 3/02* (2013.01); *G10L 15/26* (2013.01); *G10L 25/30* (2013.01);
(Continued)

(58) Field of Classification Search
CPC ......... G10L 15/30; G10L 25/63; G06N 20/10; H04L 51/046
See application file for complete search history.

(56) References Cited

U.S. PATENT DOCUMENTS

| 8,238,541 | B1 | 8/2012 | Kalavar |
| 8,688,453 | B1 | 4/2014 | Joshi et al. |

(Continued)

FOREIGN PATENT DOCUMENTS

| CN | 112397061 | * | 2/2021 |
| EP | 3706402 | * | 4/2020 |
| GB | 2591245 | * | 1/2021 |

OTHER PUBLICATIONS

Robinson, Kerry, "Natural language IVR—what, why, how?," VoxGen Limited, Sep. 27, 2019.

(Continued)

*Primary Examiner* — Farzad Kazeminezhad
(74) *Attorney, Agent, or Firm* — K&L Gates LLP

(57) ABSTRACT

Systems, apparatuses, methods, and computer program products are disclosed for predicting an emotion based on speech and text derived from the speech. An example method includes capturing speech and generating hidden vectors based on the speech and text derived from the speech. The example method further includes generating a word aligned hidden vector based on the speech hidden vector and text hidden vector. The example method further includes generating a hidden vector based on the word aligned hidden vector and the text hidden vector. The example method further includes, after further processing of the final vector, generating one or more probabilities corresponding to one or more emotions. The example method finally includes determining a next action based on the generated one or more probabilities corresponding to one or more emotions.

24 Claims, 8 Drawing Sheets

(51) Int. Cl.
  G06N 20/10 (2019.01)
  G10L 15/26 (2006.01)
  G10L 15/30 (2013.01)
  G10L 25/30 (2013.01)
  H04L 51/046 (2022.01)
(52) U.S. Cl.
  CPC .............. *G06N 20/10* (2019.01); *G10L 15/30* (2013.01); *H04L 51/046* (2013.01)

(56) References Cited

U.S. PATENT DOCUMENTS

| | | | |
|---|---|---|---|
| 11,250,876 B1* | 2/2022 | McCloskey | G06N 20/10 |
| 2004/0082839 A1 | 4/2004 | Haugen | |
| 2009/0002178 A1 | 1/2009 | Guday et al. | |
| 2014/0163960 A1 | 6/2014 | Dimitriadis et al. | |
| 2014/0244249 A1 | 8/2014 | Mohamed et al. | |
| 2015/0193718 A1 | 7/2015 | Shaburov et al. | |
| 2015/0288818 A1 | 10/2015 | Srivastava et al. | |
| 2016/0071126 A1 | 3/2016 | Chang et al. | |
| 2017/0116177 A1 | 4/2017 | Walia | |
| 2017/0169101 A1 | 6/2017 | Walia et al. | |
| 2018/0248746 A1* | 8/2018 | Deluca | H04L 51/046 |
| 2018/0285641 A1 | 10/2018 | Yan et al. | |
| 2018/0303397 A1 | 10/2018 | Krupat et al. | |
| 2018/0308487 A1 | 10/2018 | Goel et al. | |
| 2020/0104616 A1 | 4/2020 | El et al. | |
| 2020/0356999 A1 | 11/2020 | Pandey et al. | |
| 2021/0043099 A1 | 2/2021 | Du et al. | |
| 2021/0050033 A1 | 2/2021 | Bui et al. | |
| 2021/0097267 A1 | 4/2021 | Stokman et al. | |
| 2021/0192332 A1* | 6/2021 | Gangotri | G10L 15/30 |
| 2021/0287656 A1 | 9/2021 | Bonafonte et al. | |
| 2022/0043938 A1 | 2/2022 | Kochura et al. | |
| 2022/0044265 A1 | 2/2022 | Wilbert et al. | |

OTHER PUBLICATIONS

Nuance website, https://www.nuance.com/omni-channel-customer-engagement/technologies/natural-language-understanding, 2021.

SmartAction website, https://www.smartaction.ai/intelligent-front-door/, 2021.

Zen et al., "Learning Personalized Models for Facial Expression Analysis and Gesture Recognition", IEEE Transactions on Multimedia, vol. 18, No. 4, Apr. 2016, pp. 1-14.

Mustaqeem, M. Sajjad and S. Kwon, "Clustering-Based Speech Emotion Recognition by Incorporating Learned Features and Deep BiLSTM," in IEEE Access, vol. 8, p. 79861-79875, 2020, doi: 10.1109/ACCESS.2020.2990405.

Ilyas, Chaudhary Muhammad Aqdus, et al. "Deep Emotion Recognition through Upper Body Movements and Facial Expression." VISIGRAPP (5: VISAPP). 2021. (Year: 2021).

Wei, Gou, Li Jian, and Sun Mo. "Multimodal (audio, facial and gesture) based emotion recognition challenge." 2020 15th IEEE International Conference on Automatic Face and Gesture Recognition (FG 2020). IEEE, 2020. (Year: 2020).

\* cited by examiner

SYSTEMS AND METHODS FOR DETERMINING A NEXT ACTION BASED ON A PREDICTED EMOTION BY WEIGHTING EACH PORTION OF THE ACTION'S REPLY

TECHNOLOGICAL FIELD

Example embodiments of the present disclosure relate generally to predicting emotions based on speech and text derived from speech and, more particularly, to systems and methods for determining a next action based on a predicted emotion, the predicted emotion based on speech and text derived from speech.

BACKGROUND

Many institutions, such as banks and other service and product providers, offer Interactive Voice Response (IVR) systems. Currently, customers or other users who call in to customer service centers are routed through different IVR paths based on choices that the customer makes (e.g., selecting an option from a menu of options). It takes, at least, several minutes before the customer is routed to an agent or the final IVR point. The current call routing methodologies are not intelligent, but are rules-based (e.g., based on customer selections from the generic or broad IVR menus). Calls are not assigned or re-directed to agents based on customer emotion or anything more than the previously mentioned selections. Further, there is currently no way for an IVR system to understand the tone and emotion displayed by a customer. This lack of personalization decreases customer satisfaction. For example, rules-based systems may cause certain customers to experience longer delays than they would experience in a more personalized interaction, thus exacerbating any potential frustration or anger the customer had already experienced prior to the call.

BRIEF SUMMARY

Emotion prediction is utilized in various fields today. However, IVR systems today do not effectively harness the opportunities afforded by various emotion prediction systems. For instance, emotion predictions are not utilized when determining where and how to redirect customer calls to maximize customer satisfaction and/or minimize customer dis-satisfaction.

Accordingly, Applicant has recognized a need for systems, methods, and apparatuses for predicting emotions based on speech and text derived from speech, the predicted emotion being utilized to ensure that a customer call is routed quickly and properly. Utilizing the context of a customer's speech, based on the text derived from the speech, as well as acoustic features derived from actual audio of the customer's speech, example embodiments detect a customer's emotion for use in directing a call or reaching a prompt resolution. Moreover, Applicant has recognized a need to utilize this combination to create a process that is more efficient than typical IVR systems. To this end, example systems described herein analyze the speech captured from a customer's call and text derived from the audio or speech using several Bidirectional Long Short-Term Memory (BLSTM) networks or neural networks. Based on this analysis, example embodiments may predict the customer's emotion, which in turn may be utilized in transferring or re-directing a call and/or in determining a solution.

Systems, apparatuses, methods, and computer program products are disclosed herein for predicting an emotion based on speech and text derived from the speech based on a captured speech or a portion of captured speech. The predicted emotions may be utilized to determine the next best action or personalized action. For instance, the customer's call may be directed to an agent capable of handling customers in the particular customer's current emotional state. For example, as a customer calls into an IVR system, the customer may be prompted to give a response. As the customer provides a response, the customer's response may be captured and analyzed to determine a predicted emotion. Based on such a predicted emotion, the call may or may not be transferred to a live agent or a particular IVR menu.

In one example embodiment, a method is provided for predicting an emotion based on speech and text derived from the speech. The method may include receiving, by communications circuitry, a reply comprising speech. The method may include extracting, by acoustic feature extraction circuitry, one or more acoustic features from the speech. The method may include causing, by emotion prediction circuitry, generation of audio hidden vectors using the one or more acoustic features and an audio Bidirectional Long Short-Term Memory (BLSTM) network. The method may include converting, via automatic speech recognition circuitry, the speech to text. The method may include causing, by the emotion prediction circuitry, generation of context hidden vectors using the text and a speech-context BLSTM. The method may include causing, by the emotion prediction circuitry, generation of text hidden vectors using the context hidden vectors and a text BLSTM network. The method may include causing, by the emotion prediction circuitry, generation of word aligned hidden vectors using the audio hidden vectors, the text hidden vectors, and an attention layer. The method may include causing, by the emotion prediction circuitry, generation of hidden vectors using the word aligned hidden vectors, the text hidden vectors, and a final BLSTM network. The method may include reducing, via a max-pooling layer, dimensionality of the hidden vectors to generate reduced dimensionality hidden vectors. The method may include causing, by the emotion prediction circuitry, generation of an emotion vector using the reduced dimensionality hidden vectors and a fully connected layer. The method may include normalizing, via a Softmax layer, the emotion vector to form one or more probabilities corresponding to one or more emotions. The method may include calculating, via the Softmax layer, a probability distribution based on the one or more probabilities corresponding to one or more emotions. The method may include determining, by emotion prediction circuitry, a predicted emotion and next action based on the probability distribution.

In another embodiment, the method may include, prior to extraction of the one or more acoustic features from the speech, pre-processing, by speech pre-processing circuitry, the speech.

In an embodiment, the emotion vector may be of a size determined by a number of emotions considered. In an embodiment, the predicted emotion may comprise a numeric value indicating an emotion. In an embodiment, the one or more acoustic features may comprise one or more of zero crossing rate, spectral centroid, spectral spread, spectral entropy, spectral flux, spectral roll-off, and Mel frequency cepstral coefficients.

In an embodiment, the reply is a portion of a total reply given by a customer. The next action may further be based on the predicted emotion for each portion of the total reply in real-time. The predicted emotion for each portion of the total reply may be weighted based on a time of a portion of the total reply. In an embodiment, later portions of the total reply, in relation to time, are weighted higher than early portions of the total reply, in relation to time. In another embodiment, early portions of the total reply, in relation to time, are weighted higher than later portions of the total reply, in relation to time.

In an embodiment, the reply may comprise speech in response to a prompt from interactive voice response system during a customer call. The method may include re-directing, via call processing circuitry, the customer call to one of one or more live agents based on the next action. The method may include, prior to re-direction of the customer call, identifying, via call processing circuitry, one or more live agents and a call handling history corresponding to each of the one or more live agents. The call handling history may comprise one or more of a live agent's ranking corresponding to particular emotions, a live agent's rating from customers and the customers corresponding predicted emotions at a time of the rating, and a live agent's experience. The re-direction of the customer call may further be based on the predicted emotion and the call handling history corresponding to each of the one or more live agents.

In an embodiment, the next action may include providing one or more of personalized product recommendations and personalized service recommendations. In another embodiment, the determination of the next action may further be based on a customer's call history. The determination of the next action may further be based on a customer's emotion history. In an embodiment, pre-processing may include noise reduction and speech end point detection.

In one example embodiment, an apparatus is provided for predicting an emotion based on speech and text derived from the speech. The apparatus may include a communications circuitry configured to receive a reply comprising speech. The apparatus may include an acoustic feature extraction circuitry configured to extract one or more acoustic features of the reply. The apparatus may include an automatic speech recognition circuitry configured to convert the reply to text.

The apparatus may include an emotion prediction circuitry configured to cause, via a context BLSTM network, generation of context hidden vectors based on the text. The emotion prediction circuitry may be configured to cause, via a text BLSTM network, generation of text hidden vectors based on the context hidden vectors. The emotion prediction circuitry may be configured to cause, via an attention layer, generation of word aligned hidden vectors using the audio hidden vectors and the text hidden vectors. The emotion prediction circuitry may be configured to cause, via an audio BLSTM network, generation of audio hidden vectors based on the one or more acoustic features of the reply. The emotion prediction circuitry may be configured to cause, via a final BLSTM network, generation of hidden vectors based on the text hidden vectors and word aligned hidden vectors. The emotion prediction circuitry may be configured to reduce, via a max-pooling layer, dimensionality of the hidden vectors to generate reduced dimensionality hidden vectors. The emotion prediction circuitry may be configured to cause, via a fully connected layer, generation of an emotion vector using the reduced dimensionality hidden vector. The emotion prediction circuitry may be configured to normalize, via a Softmax layer, the emotion vector to form one or more probabilities corresponding to one or more emotions. The emotion prediction circuitry may be configured to calculate, via the Softmax layer, a probability distribution based on the one or more probabilities corresponding to one or more emotions. The emotion prediction circuitry may be configured to determine a predicted emotion and next action based on the probability distribution.

In an embodiment, the one or more acoustic features may include one or more of zero crossing rate, spectral centroid, spectral spread, spectral entropy, spectral flux, spectral roll-off, and Mel frequency cepstral coefficients. In another embodiment, the next action may comprise one or more of re-direction to a live agent, re-direction to a live agent in a particular group, re-direction to a specified live-agent, product suggestions, service suggestion, another IVR menu, and issue resolution and wherein a call processing circuitry is configured to perform the next action. In another embodiment, the context BLSTM network may comprise an Embeddings from Language Models (ELMo).

In one example embodiment, a computer program product is provided for predicting a customer's emotions. The computer program product may comprise at least one non-transitory computer-readable storage medium storing software instructions that, when executed, cause an apparatus to perform actions. The software instructions, when executed, may, in response to a reply, capture speech. The software instructions, when executed, may extract one or more acoustic features from the speech. The software instructions, when executed, may cause, via an audio Bidirectional Long Short-Term Memory (BLSTM) network, generation of audio hidden vectors based on the acoustic features. The software instructions, when executed, may convert the speech to text. The software instructions, when executed, may cause, via an Embeddings from Language Models (ELMo), generation of context hidden vectors based on the text. The software instructions, when executed, may cause, via a text BLSTM network, generation of text hidden vectors based on the context hidden vectors. The software instructions, when executed, may cause, via an attention layer, generation of word aligned hidden vectors based on audio hidden vectors and text hidden vectors. The software instructions, when executed, may cause, via a final BLSTM network, generation of hidden vectors based on word aligned hidden vectors and the text hidden vectors. The software instructions, when executed, may reduce, via a max-pooling layer, dimensionality of the hidden vectors to generate reduced dimensionality hidden vectors. The software instructions, when executed, may cause, via a fully connected layer, generation of an emotion vector using the reduced dimensionality hidden vector. The software instructions, when executed, may normalize, via a Softmax layer, the emotion vector to form one or more probabilities corresponding to one or more emotions. The software instructions, when executed, may calculate, via the Softmax layer, a probability distribution based on the one or more probabilities corresponding to one or more emotions. The software instructions, when executed, may determine a predicted emotion and next action based on the one or more probabilities corresponding to one or more emotions. In another embodiment, the speech may be captured from one or more of a customer and an agent.

The foregoing brief summary is provided merely for purposes of summarizing example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments of the present disclosure in general terms above, reference will now be made to the accompanying drawings, which are not necessarily drawn to scale. Some embodiments may include fewer or more components than those shown in the figures.

DETAILED DESCRIPTION

Figure 1:
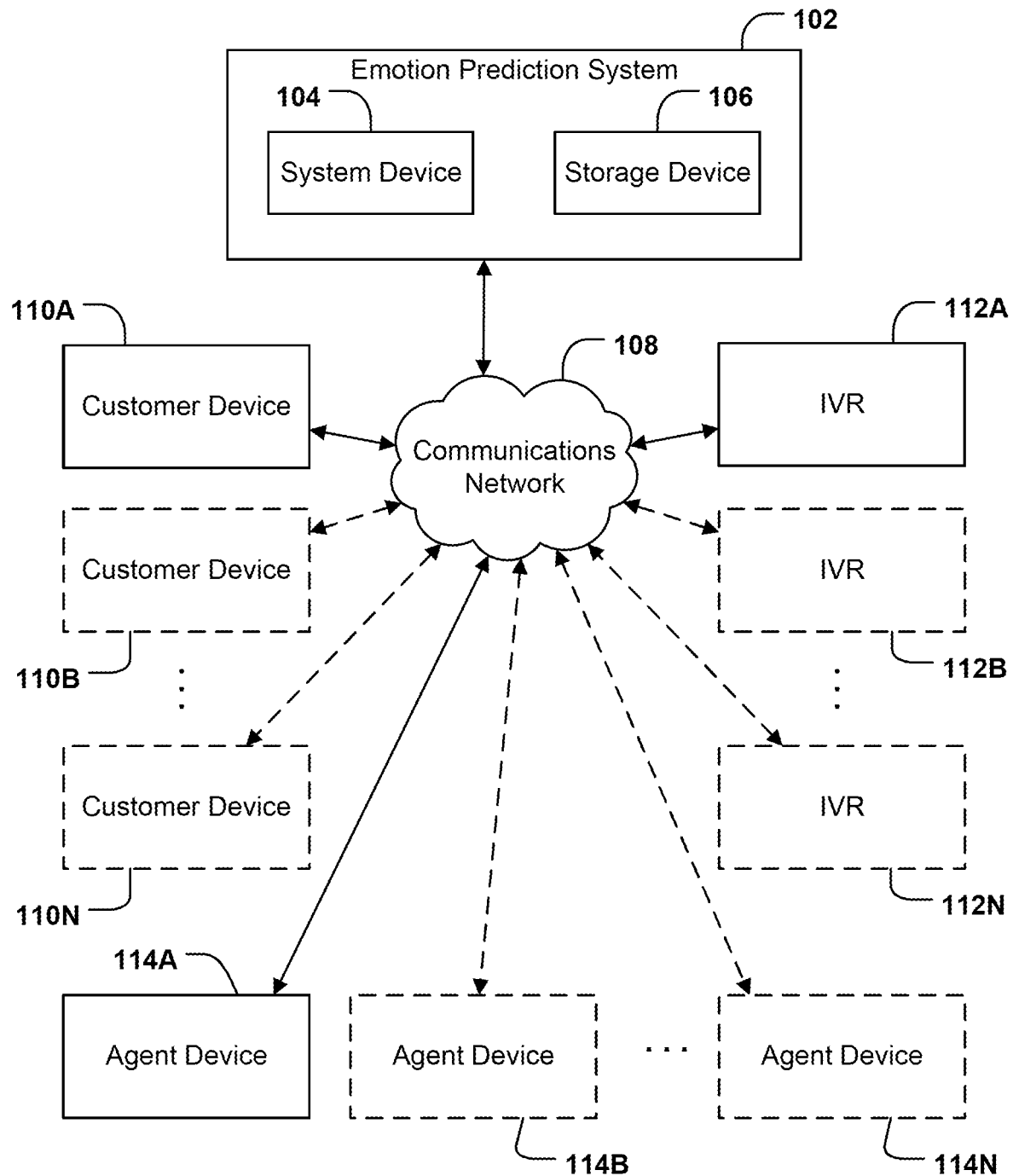
FIG. 1 illustrates a system in which some example embodiments may be used.

Some embodiments of the present disclosure will now be described more fully hereinafter with reference to the accompanying figures, in which some, but not all, embodiments of the disclosures are shown. Indeed, these disclosures may be embodied in many different forms and should not be construed as limited to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

Overview

As noted above, methods, apparatuses, systems, and computer program products are described herein that provide for predicting an emotion based on speech and text derived from the speech and, based on the emotion prediction, providing for a next best action or personalized action for a customer call. Traditionally, customer service interactions utilize an IVR system. It can take a long time until a customer's issue is resolved or until the customer's call is directed to the proper person. As a call takes longer, customers may grow frustrated and/or angry, but calls will continue on the same path. While a customer's emotion could be given as feedback after the fact, there is no way for a customer's emotion or current emotional state to determine the best route for the call. There is no way to customize a customer's route through an IVR system. In addition, there is typically no way to determine the which employees may be most suited to handle a particular emotion (e.g., no personalized solution). Further, employees are not evaluated or prioritized based on how they handle particular predicted emotions and calls are not re-directed to different employees based on such evaluations.

In contrast to these conventional techniques for determining emotion based only on audio or text, the present disclosure describes determining emotion and/or one or more probabilities indicating one or more emotions based on speech and text derived from the speech. Further, the determined emotion or probabilities utilized to determine a best call route or re-direction and also to optimize which employees or call center agents receive calls based on predicted emotions. To address these issues, when a customer calls in, the customer's speech or reply may be captured. All or a portion of the captured speech may be transmitted for audio preprocessing. The pre-processing steps or operations may reduce noise, determine a speech endpoint, among other features. The pre-processed audio may then be sent to separate modules or circuits. One module or circuit may include an acoustic feature module or circuit. The acoustic feature module or circuit may determine audio hidden vectors via an audio BLSTM network. The audio hidden vectors may be a series of words, phrases, one of an acoustic feature, and/or other characteristic of audio speech including an associated value or indicator, such a value or indicator indicating a likelihood of a particular emotion. Another module or circuitry may be an audio speech recognition (ASR) module or circuitry. The ASR circuitry may first convert the audio to text. The text may then be transmitted to context BLSTM network (e.g., an Embeddings from Language Model (ELMo)), thereby forming context hidden vectors. The context BLSTM network may create word hidden vectors by passing entire text through BLSTM networks coupled with a Language Model instead of having a dictionary look up of words. Thus, the context of words in a speech may be determined. The output context hidden vector may then be passed to a text BLSTM network trained to determine emotion. The output of the text BLSTM network may be text hidden vector. The output from the text BLSTM network and acoustic feature module or circuit may be transmitted to an attention layer. The attention layer is used to learn the alignment between the hidden vectors corresponding to speech and text features. As hidden vectors related to speech are less in number compared to the hidden vectors related to text, the word aligned speech vectors are created using the attention layer. Each word aligned speech vector is created as the normalized weighted sum of the audio hidden vectors. These normalized weights act as attentions and are obtained as the weighted combination of the audio and text hidden vectors where the weights/parameters are learned during training. The word aligned hidden vectors and text hidden vectors are concatenated and are further processed using BLSTM networks to learn the representations that are optimal for emotion prediction.

The output of the attention layer and the output of the text BLSTM network may be transmitted to another BLSTM network to further refine the emotion prediction. The output vectors may be transmitted to a max-pooling layer. The max-pooling layer is used to reduce the dimension of the hidden vectors obtained from BLSTM network which, in turn, avoids high complexity in the following fully connected network, the complexity depending on the input dimension. The max-pooling layer uses a sliding kernel on the input vector and for each kernel placement, the maximum value is considered in the output vector. Likewise, the output vector is obtained by considering maximum values from the input vector. The output vector may be transmitted to a fully connected layer. In the fully connected layer, the inputs from one layer are connected to every node of the next layer. The network complexity (number of weights) depends on the input dimension and number of hidden layers. The last layer in the fully connected layer outputs an M-dimensional vector where M is the number categories of emotions that are considered. The M-dimensional vector may be transmitted to a Softmax module or circuit. Emotion recognition may be treated as a multi-class classification problem. Thus, Softmax activation is used, which is a generalization of logistic function to multiple dimensions. The Softmax module takes the M-dimensional vector from the fully connected layer and normalizes it into a probability distribution consisting of M probabilities. Thus, the output of the Softmax module consists of values between 0 and 1. The emotion class corresponding to the maximum probability score is considered a final prediction from the model.

Accordingly, the present disclosure sets forth systems, methods, and apparatuses that accurately predict a customer's emotion based on the customer's speech and the context of and text derived from that speech. There are many advantages of these and other embodiments described herein. For instance, reduced call time waiting. As a customer calls into customer service, rather than waiting to get through multiple IVR menus, if a customer is exhibiting a particular emotion, the system or apparatus may ensure the call is handled in a particular way (e.g., escalation). Such an action and/or other actions describe herein may increase customer satisfaction. In particular, as customer call wait times are reduced, customer satisfaction will increase. Further, for customers experiencing frustration, anger, or other similar negative emotions, prompt redirection and resolution ensure that customer satisfaction may increase. Finally, customers may be transferred or redirected to proper call center agents and, further, the call center agents may be evaluated and classified based on the call center agent's emotion or handling of a customer experiencing a particular emotion. For instance, as a customer's emotion (e.g., anger) is predicted, the call may be re-directed to a call center agent with experience handling customer's experiencing such emotions (e.g., anger).

Although a high level explanation of the operations of example embodiments has been provided above, specific details regarding the configuration of such example embodiments are provided below.

System Architecture

Example embodiments described herein may be implemented using any of a variety of computing devices or servers. To this end, FIG. 1 illustrates an example environment within which embodiments of the present disclosure may operate. As illustrated, an emotion prediction system 102 may include a system device 104 in communication with a storage device 106. Although system device 104 and storage device 106 are described in singular form, some embodiments may utilize more than one system device 104 and/or more than one storage device 106. Additionally, some embodiments of the emotion prediction system 102 may not require a storage device 106 at all. Whatever the implementation, the emotion prediction system 102, and its constituent system device(s) 104 and/or storage device (s) 106 may receive and/or transmit information via communications network 108 (e.g., the Internet) with any number of other devices, such as one or more of customer device 110A, customer device 110B, through customer device 110N, IVR 112A, IVR 112B, through IVR 112N, and/or agent device 114A, agent device 114B, through agent device 114N.

System device 104 may be implemented as one or more servers, which may or may not be physically proximate to other components of emotion prediction system 102. Furthermore, some components of system device 104 may be physically proximate to the other components of emotion prediction system 102 while other components are not. System device 104 may receive, process, generate, and transmit data, signals, and electronic information to facilitate the operations of the emotion prediction system 102. Particular components of system device 104 are described in greater detail below with reference to apparatus 200 in connection with FIG. 2.

Storage device 106 may comprise a distinct component from system device 104, or may comprise an element of system device 104 (e.g., memory 204, as described below in connection with FIG. 2). Storage device 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 108). Storage device 106 may host the software executed to operate the emotion prediction system 102. Storage device 106 may store information relied upon during operation of the emotion prediction system 102, such as various audio recordings and speech-to-text files that may be used by the emotion prediction system 102, data and documents to be analyzed using the emotion prediction system 102, or the like. In addition, storage device 106 may store control signals, device characteristics, and access credentials enabling interaction between the emotion prediction system 102 and one or more of the customer devices 110A-110N, IVRs 112A-112N, or agent devices 114A-114N.

The one or more IVR 112A-112N may be embodied by any storage devices known in the art. Similarly, the one or more customer device 112A-112N and/or agent device 114A-114N may be embodied by any computing devices known in the art, such as desktop or laptop computers, tablet devices, smartphones, or the like. The one or more customer devices 110A-110N, the one or more IVRs 112A-112N, and the one or more agent devices 114A-114N need not themselves be independent devices, but may be peripheral devices communicatively coupled to other computing devices.

Although FIG. 1 illustrates an environment and implementation of the present disclosure in which the emotion prediction system 102 interacts with one or more of customer devices 110A-110N, IVRs 112A-112N, and/or agent devices 114A-114N, in some embodiments one or more of the users or agents may directly interact with the emotion prediction system 102 (e.g., via input/output circuitry of system device 104), in which case a separate device may not need to be utilized for such users or agents. Whether by way of direct interaction or interaction via a separate device, users and agents may communicate with, operate, control, modify, or otherwise interact with the emotion prediction system 102 to perform functions described herein and/or achieve benefits as set forth in connection with this disclosure.

Example Implementing Apparatuses

Figure 2:
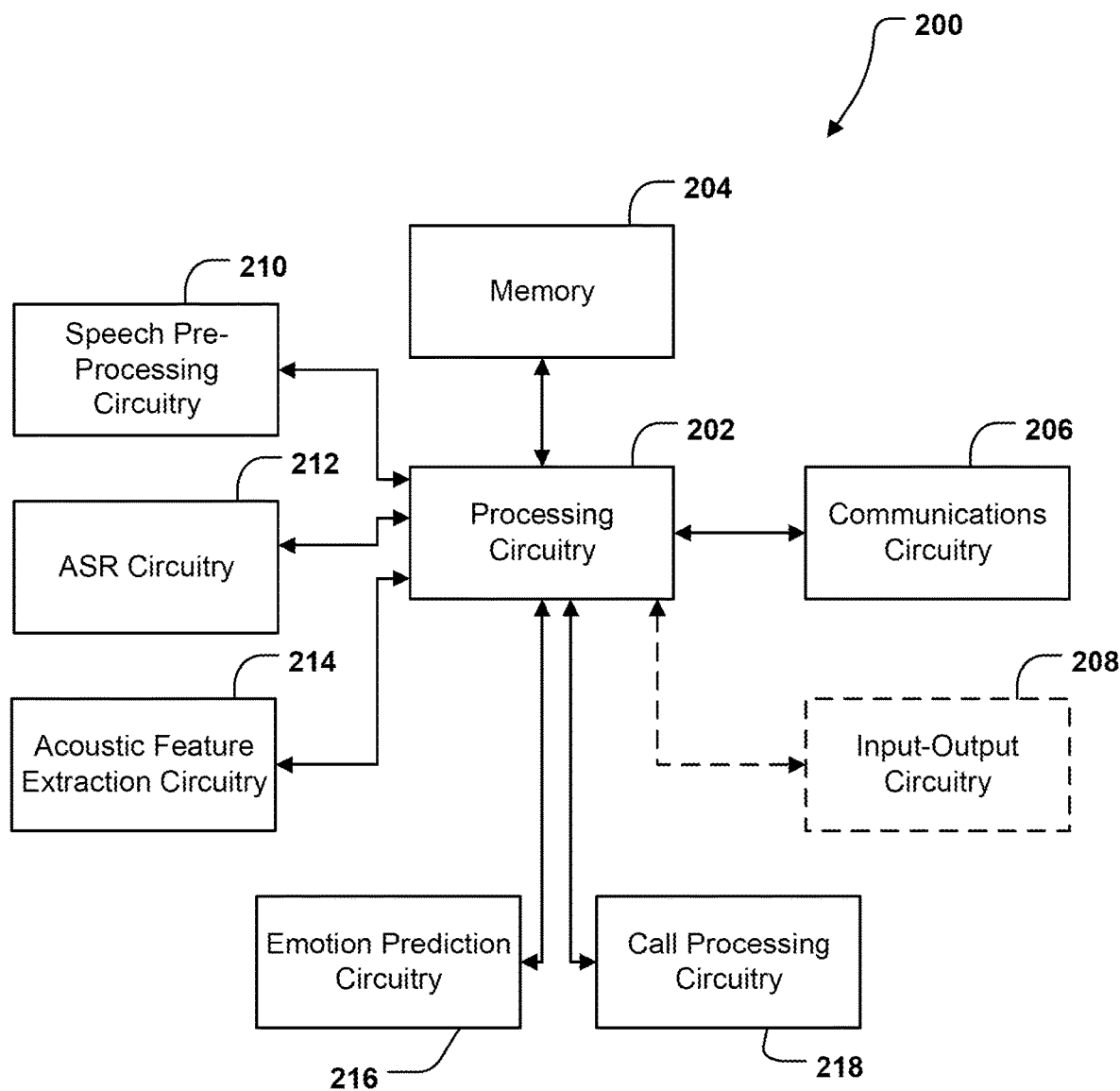
FIG. 2 illustrates a schematic block diagram of example circuitry embodying a device that may perform various operations in accordance with some example embodiments described herein.

System device 104 of the emotion prediction system 102 (described previously with reference to FIG. 1) may be embodied by one or more computing devices or servers, shown as apparatus 200 in FIG. 2. As illustrated in FIG. 2, the apparatus 200 may include processor 202, memory 204, communications circuitry 206, input-output circuitry 208, Speech pre-processing circuitry 210, audio speech recognition (ASR) circuitry 212, acoustic feature extraction circuitry 214, emotion prediction circuitry 216, and call processing circuitry 218, each of which will be described in greater detail below. While the various components are only illustrated in FIG. 2 as being connected with processor 202, it will be understood that the apparatus 200 may further comprises a bus (not expressly shown in FIG. 2) for passing information amongst any combination of the various components of the apparatus 200. The apparatus 200 may be configured to execute various operations described herein, such as those described above in connection with FIG. 1 and below in connection with FIGS. 5A-5C.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof The processor 202 may be configured to execute software instructions stored in the memory 204 or otherwise accessible to the processor (e.g., software instructions stored on a separate storage device 106, as illustrated in FIG. 1). In some cases, the processor may be configured to execute hard-coded functionality. As such, whether configured by hardware or software methods, or by a combination of hardware with software, the processor 202 represents an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications circuitry 206 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 206 may include, for example, a network interface for enabling communications with a wired or wireless communication network. For example, the communications circuitry 206 may include one or more network interface cards, antennas, buses, switches, routers, modems, and supporting hardware and/or software, or any other device suitable for enabling communications via a network. Furthermore, the communications circuitry 206 may include the processing circuitry for causing transmission of such signals to a network or for handling receipt of signals received from a network.

The apparatus 200 may include input-output circuitry 208 configured to provide output to a user and, in some embodiments, to receive an indication of user input. It will be noted that some embodiments will not include input-output circuitry 208, in which case user input may be received via a separate device such as a customer device 110A-110N and/or agent device 114A-114N (shown in FIG. 1). The input-output circuitry 208 may comprise a user interface, such as a display, and may further comprise the components that govern use of the user interface, such as a web browser, mobile application, dedicated client device, or the like. In some embodiments, the input-output circuitry 208 may include a keyboard, a mouse, a touch screen, touch areas, soft keys, a microphone, a speaker, and/or other input/output mechanisms. The input-output circuitry 208 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises speech pre-processing circuitry 210 that pre-processes audio input from a customer or other user. The speech pre-processing circuitry 210 may utilize processor 202, memory 204, or any other hardware component included in the apparatus 200 to perform these operations, as described in connection with FIGS. 5A-5C below. The speech pre-processing circuitry 210 may further utilize communications circuitry 206 to gather data from a variety of sources (e.g., customer device 110A through customer device 110N, agent device 114A through agent device 114N, or storage device 106, as shown in FIG. 1), may utilize input-output circuitry 208 to receive data from a user, and in some embodiments may utilize processor 202 and/or memory 204 to process audio input from a customer, agent, or other user. The output of the speech pre-processing circuitry 210 may be transmitted to other circuitry of the apparatus 200 (e.g., ASR circuitry 212 and/or acoustic feature extraction circuitry 214). In an embodiment, the speech pre-processing circuitry 210, prior to pre-processing, may capture a reply or speech or a portion of a reply or speech from a customer and/or agent. In another embodiment, the reply or speech or a portion of a reply or speech from a customer and/or agent may be captured by other circuitry and provided or transmitted to the speech pre-processing circuitry 210.

In addition, the apparatus 200 further comprises an ASR circuitry 212 that converts audio to text and may create a context related hidden vector via a context BLSTM network (e.g., an ELMo) included, for example as instructions, in the ASR circuitry 212. The ASR circuitry 212 may utilize processor 202, memory 204, or any other hardware component included in the apparatus 200 to perform these operations, as described in connection with FIGS. 5A through 5C below. The ASR circuitry 212 may further utilize communications circuitry 206 to gather data from a variety of sources (e.g., customer device 110A through customer device 110N, agent device 114A through agent device 114N, or storage device 106, as shown in FIG. 1), may utilize input-output circuitry 208 to receive data from a user, and in some embodiments may utilize processor 202 and/or memory 204 to convert audio to text, to create a context related hidden vector, and/or create a hidden vector from the context related hidden vector including likelihoods of particular emotions. The output of the ASR circuitry 212 may be transmitted to other circuitry of the apparatus 200 (e.g., emotion prediction circuitry 216).

In addition, the apparatus 200 may also comprise an acoustic feature extraction circuitry 214 that extracts various features from customer, agent, or other user audio and may create a hidden vector via an included BLSTM network. As used herein, a BLSTM network may refer to a type of neural network, recurrent neural network, or other trained machine learning algorithm, as will be understood by a person skilled in the art. The acoustic feature extraction circuitry 214 may utilize processor 202, memory 204, or any other hardware component included in the apparatus 200 to perform these operations, as described in connection with FIGS. 5A through 5C below. The acoustic feature extraction circuitry 214 may further utilize communications circuitry 206 to gather data from a variety of sources (e.g., customer device 110A through customer device 110N, agent device 114A through agent device 114N, or storage device 106, as shown in FIG. 1), may utilize input-output circuitry 208 to receive data from a user, and in some embodiments may utilize processor 202 and/or memory 204 to create hidden vector(s) including likelihoods of particular emotions. The output of the acoustic feature extraction circuitry 214 may be transmitted to other circuitry of the apparatus 200 (e.g., emotion prediction circuitry 216).

In addition, the apparatus 200 may also comprise an emotion prediction circuitry 216 that, utilizing the output from the ASR circuitry 212 and the acoustic feature extraction circuitry 214, outputs a prediction of a customer's, agent's, or other user's emotion. Additionally, rather than creating such vectors in the ASR circuitry 212 and the acoustic feature extraction circuitry 214, the emotion prediction circuitry 214 may utilize outputs from the ASR circuitry 212 and the acoustic feature extraction circuitry 214 to create various vectors. The emotion prediction circuitry 214 may create text hidden vectors using the context hidden vectors and a text BLSTM network, create a context related hidden vector via a context BLSTM network, create an audio hidden vector via an included audio BLSTM network, create a word aligned hidden vectors using the audio hidden vectors, the text hidden vectors, and an attention layer, and/or create hidden vectors using the word aligned hidden vectors, the text hidden vectors, and a final BLSTM network. Further, the emotion prediction circuitry 216 may reduce dimensionality of the hidden vector via a max-pooling layer, generate an emotion vector of a size determined by a number of emotions considered using the reduced dimensionality hidden vector via a fully connected layer, normalize the emotion vector to thereby form one or more probabilities corresponding to one or more emotions, and/or calculate a probability distribution based on the one or more probabilities corresponding to one or more emotions. The emotion prediction circuitry 216 may utilize processor 202, memory 204, or any other hardware component included in the apparatus 200 to perform these operations, as described in connection with FIGS. 5A through 5C below. The emotion prediction circuitry 216 may further utilize communications circuitry 206 to gather data from a variety of sources (e.g., customer device 110A through customer device 110N, agent device 114A through agent device 114N, or storage device 106, as shown in FIG. 1), may utilize input-output circuitry 208 to receive data from a user, and in some embodiments may utilize processor 202 and/or memory 204 to create a number (e.g., numeric value) or probability indicative of a customer's, agent's, or other user's emotion. The output of the emotion prediction circuitry 216 may be transmitted to other circuitry of the apparatus 200. The emotion prediction circuitry 216 may further determine a next best action for a call based on the number or probability indicative of the customer's, agent's or other user's emotion. The output of emotion prediction circuitry 216 may be transmitted to other circuitry of the apparatus 200 (e.g. call processing circuitry 218).

Finally, the apparatus 200 may also comprise a call processing circuitry 218 that, utilizing the output from the emotion prediction circuitry 216, executes the next action. a prediction of a customer's, agent's, or other user's emotion. The call processing circuitry 218 may utilize processor 202, memory 204, or any other hardware component included in the apparatus 200 to perform these operations, as described in connection with FIGS. 5A through 5C below. The call processing circuitry 218 may further utilize communications circuitry 206 and/or input-output circuitry 208 to perform or execute the next action. For example, the next action may be to transfer a call from an IVR (e.g., IVR 112A-112N) to an agent (e.g., to an agent device 110A-110N). In such examples, the call processing circuitry 218 may facilitate or otherwise cause a call to be re-directed from the IVR to the agent. The call processing circuitry 218 may perform other functions, such as re-directing calls from one particular IVR menu to another, selecting a particular agent based on an emotion exhibited by a customer, storing a customer's personalized product or service recommendation, re-directing a call based on the customer's personalized product or service recommendation, determining an agent's rating or ranking, and/or generating a call back for a customer. The call processing circuitry 218 may determine a customer's personalized product or service recommendations based on the text of the customer's speech and/or the context of the speech. For example, a customer may call a service center to discuss an overdraft fee or other fee. During replies to an IVR or agent, the customer may mention different products or services. Based on the text and context associated with such a mention, the call processing circuitry 218 may, after initial issue resolution, recommend a product or service, prompt an agent to recommend a product or service, and/or re-direct the call to an IVR or agent corresponding to the recommended product or service.

In another embodiment, the call processing circuitry 218 may perform other functions. The call processing circuitry 218 may determine product recommendations and/or service recommendations based on text captured during a customer's interaction whether with an IVR or agent. For example, if a customer mentions a credit card or a particular loan, the call processing circuitry 218 may determine that a product or service recommendation includes credit counseling, a new credit card, or a new type of loan, among other products or services. Such product or service recommendations may be given to the customer at varying points during a call (such as, after issue resolution) via an IVR, an agent, as a call-back, and/or via a form of electronic communication (text message, e-mail, etc.), among other suitable communication methods as will be understood by a person skilled in the art. As noted, the call processing circuitry 218 may re-direct calls to different live agents or IVR menus. For example, if a customer mentions a credit card issue, but is currently interacting with a different IVR (e.g., mortgages), the customer may be re-directed to a credit card IVR. The call processing circuitry 218 may further direct calls based on other factors, such as live agent qualities, characteristics, and/or other objective data (e.g., business unit or group). For example, if the customer exhibits a particular emotion, such as anger, rather than re-directing the call to another IVR, the call may be re-directed to an agent. Further still, the agent may be chosen based on the agent's history handling particular emotions, the live agent's product or service group, and/or based on other agent characteristics or qualities.

Although components 202-218 are described in part using functional language, it will be understood that the particular implementations necessarily include the use of particular hardware. It should also be understood that certain of these components 202-218 may include similar or common hardware. For example, the Speech pre-processing circuitry 210, ASR circuitry 212, acoustic feature extraction circuitry 214, emotion prediction circuitry 216, and call processing circuitry 218 may each at times leverage use of the processor 202, memory 204, communications circuitry 206, or input-output circuitry 208, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry," and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 200 to perform the various functions described herein.

Although the speech pre-processing circuitry 210, ASR circuitry 212, acoustic feature extraction circuitry 214, emotion prediction circuitry 216, and call processing circuitry 218 may leverage processor 202, memory 204, communications circuitry 206, or input-output circuitry 208 as described above, it will be understood that any of these elements of apparatus 200 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or memory 204, communications circuitry 206 or input-output circuitry 208 for enabling any functions not performed by special-purpose hardware elements. In all embodiments, however, it will be understood that the Speech pre-processing circuitry 210, ASR circuitry 212, acoustic feature extraction circuitry 214, and emotion prediction circuitry 216 are implemented via particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200 Thus, some or all of the functionality described herein may be provided by third party circuitry. For example, a given apparatus 200 may access one or more third party circuitries via any sort of networked connection that facilitates transmission of data and electronic information between the apparatus 200 and the third party circuitries. In turn, that apparatus 200 may be in remote communication with one or more of the other components describe above as comprising the apparatus 200.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatuses 200, example embodiments of the present disclosure are described below in connection with a series of graphical user interfaces and flowcharts.

GUI

Figure 3:
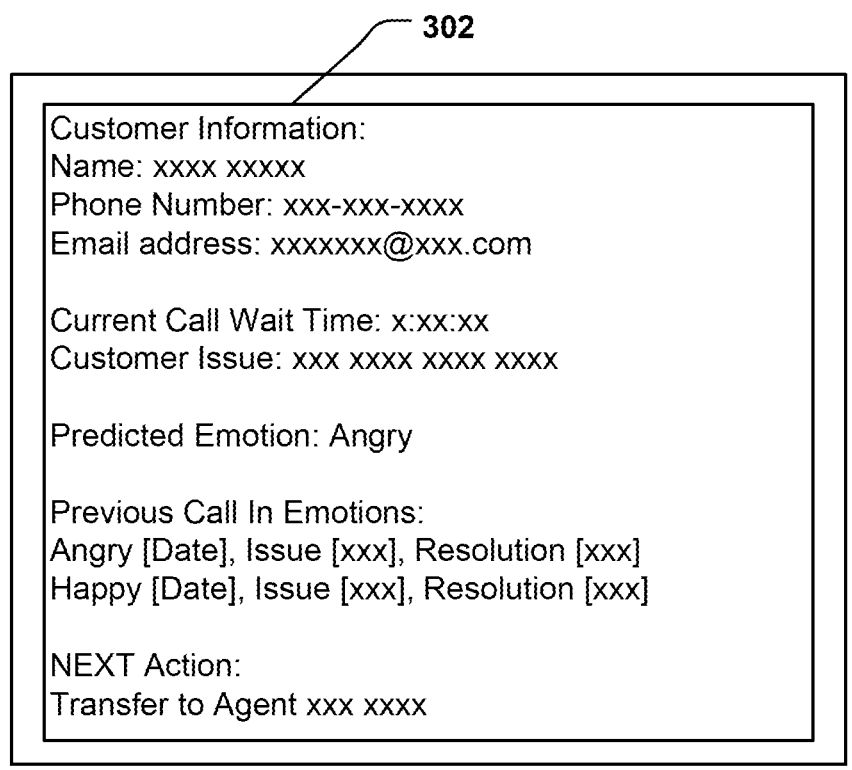
FIG. 3 illustrates an example graphical user interface (GUI) used in some example embodiments described herein.

Turning to FIG. 3, a graphical user interface (GUI) 302 is provided that illustrates what an agent sees after a prediction is made. As noted previously, the agent may interact with the emotion prediction system 102 by directly engaging with input-output circuitry 208 of an apparatus 200 comprising a system device 104 of the emotion prediction system 102. In such an embodiment, the GUI shown in FIG. 3 may be displayed to the agent by the apparatus 200. Alternatively, the agent may interact with the emotion prediction system 102 using a separate agent device (e.g., any of agent devices 114A-114N, as shown in FIG. 1), which may communicate with the emotion prediction system 102 via communications network 108. In such an embodiment, the GUI 302 shown in FIG. 3 may be displayed to the agent by the agent device.

As described herein, a customer may call a customer service center from a customer device (e.g., any of customer devices 110A-110N, as shown in FIG. 1). The customer may respond to prompts transmitted by an IVR (e.g., any of IVRs 112A-112N). This information may be received by the emotion prediction system 102, which may in turn identify the customer's emotion and may, based on that identified customer emotion, cause the call to be transferred from the IVR (e.g., any of IVRs 112A-112N) to an agent device (e.g., one of agent devices 114A-114N). In addition to causing transfer of the call to the agent device, various data points may be transmitted to the agent device. The GUI 302 may thereafter present such information for review by the agent using the agent device. The information may include a customer's personal information, the reason (if known) that a customer called, a customer call history, and the customer's predicted emotion. In such examples, the agent receiving the call may receive the call based on the agent's experience handling customers experiencing the predicted emotion. Knowledge of the customer's predicted emotion may allow for the agent to act appropriately to address the customer more successfully than may otherwise be expected. The forwarding of the call may be based on various other information, such as the caller's emotion history, the caller's current emotion, and/or other information.

Example Operations

Figure 4A:
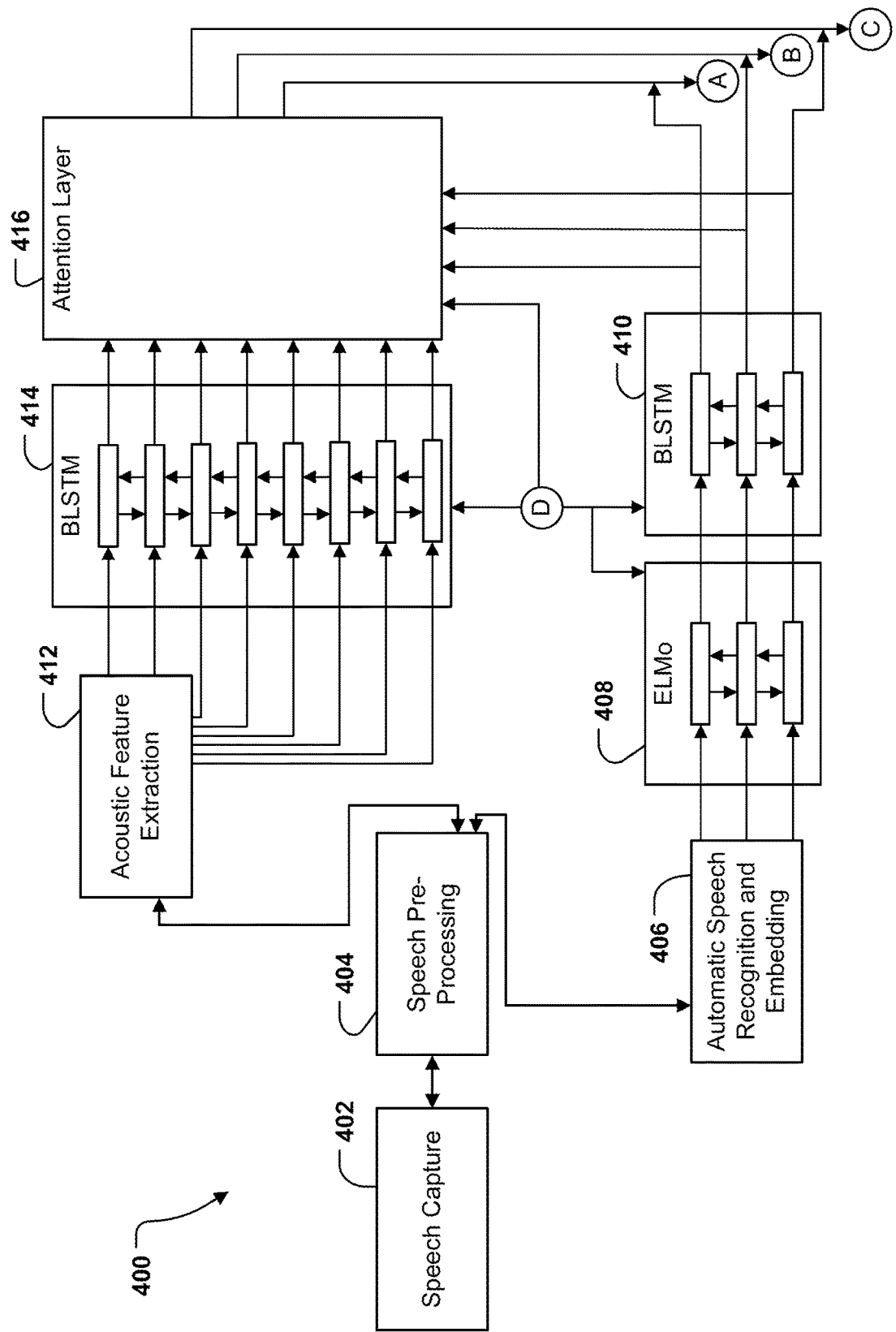
FIGS. 4A and 4B illustrate example schematic block diagrams used in some example embodiments described herein.
Figure 4B:
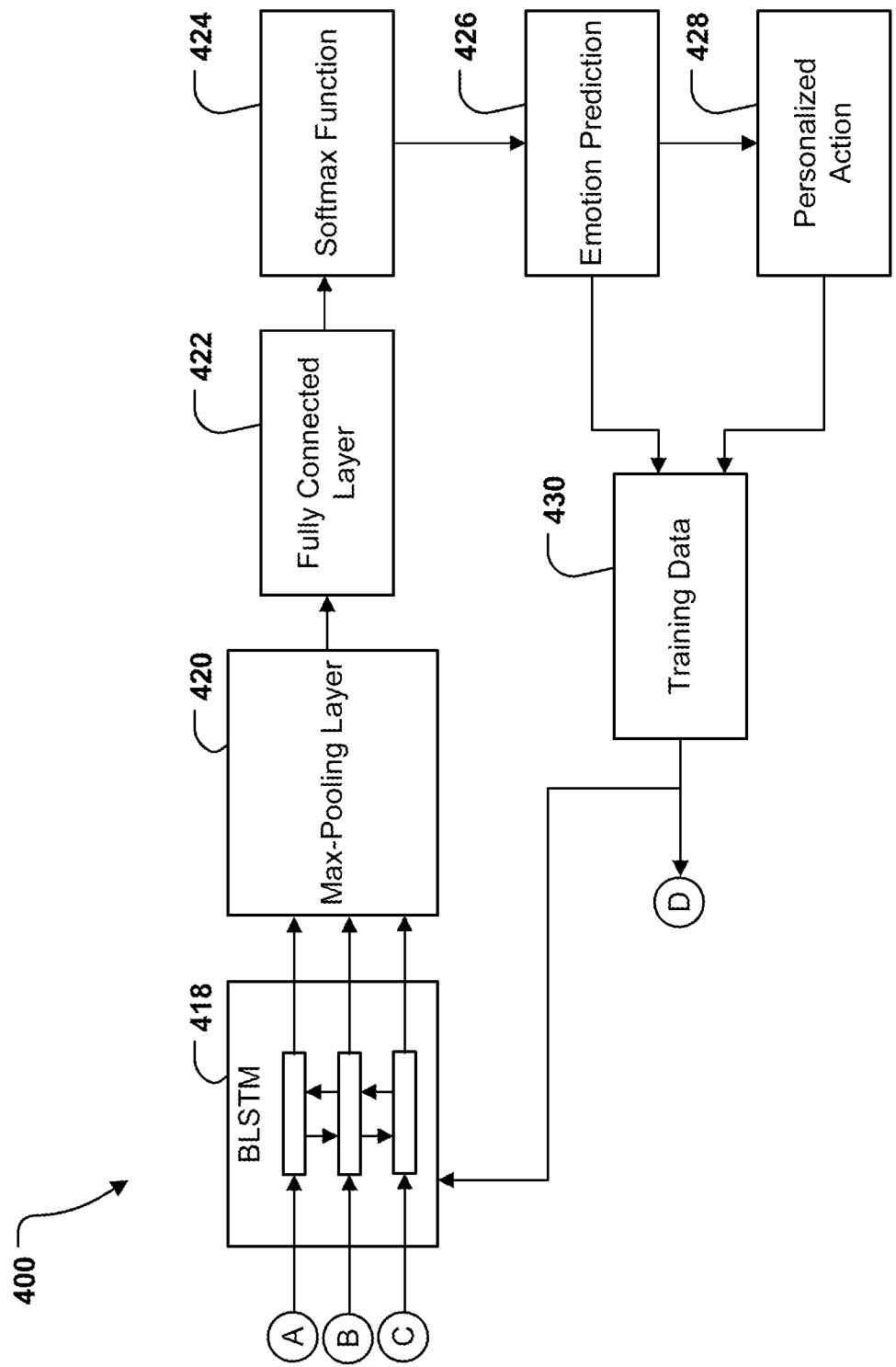

Turning first to FIGS. 4A and 4B, a schematic block diagram 400 is shown that represents an example emotion prediction flow, as, for example, implemented in emotion prediction system 102 and/or apparatus 200. To perform the operations described below, the apparatus 200 may utilize one or more of processor 202, memory 204, communications circuitry 206, input-output circuitry 208, Speech pre-processing circuitry 210, ASR circuitry 212, acoustic feature extraction circuitry 214, emotion prediction circuitry 216, call processing circuitry 218, and/or any combination thereof. It will be understood that user interaction with the emotion prediction system 102 may occur directly via input-output circuitry 208, or may instead be facilitated by a separate IVR 112A-112N, as shown in FIG. 1, and which may have similar or equivalent physical componentry facilitating such user interaction.

As illustrated in FIG. 4A, such an example may begin with speech capture 402. Circuitry of apparatus 200 (e.g., such as speech pre-processing circuitry 210) may capture or record speech or a reply from a customer, agent, and/or other user at 402. The captured speech may be transmitted for speech pre-processing 404 (e.g., such an operation performed or executed by speech pre-processing circuitry 210). The speech pre-processing 404 may reduce noise of the captured speech, determine an end point of the captured speech, or perform other functions to enable further enable emotion prediction.

Next, acoustic features may be extracted from the pre-processed speech at 412. Such a feature may be performed or executed by the acoustic feature extraction circuitry 214. Acoustic feature extraction 412 may include extracting or separating each different acoustic feature from the captured pre-processed speech. Such acoustic features may include zero crossing rate, spectral centroid, spectral spread, spectral entropy, spectral flux, spectral roll-off, and/or Mel frequency cepstral coefficients. Each acoustic feature may be transmitted, as a vector or as part of a vector, to an acoustic feature or audio BLSTM network 414. The acoustic feature or audio BLSTM network 414 may output an audio hidden vector relating to the likelihood of an emotion for a particular acoustic feature. The audio hidden vector may be transmitted to an attention layer 416.

In addition, the captured speech or reply may be transmitted for ASR and embedding 406. Such a feature may be performed or executed by ASR circuitry 212 of the apparatus 200. ASR and embedding 406 may include converting the pre-processed speech to text. The text may be transmitted to a context BLTSM network, for example ELMo 408. The ELMo 408 may create or generate a context or ELMo hidden vector relating to the context of each word or subset of words in the text. The context or ELMo hidden vector may then be transmitted to a text BLSTM network 410. The text BLSTM network 410 may create or generate a text hidden vector relating to an emotion of text based on the context and word choice of the text, among other aspects. The text BLSTM network 410 may transmit the text hidden vector to the attention layer 46 and further to an additional BLSTM network 418.

As noted, the text hidden vector and audio hidden vector may be transmitted to an attention layer 416. The attention layer 416 is used to learn the alignment between the hidden vectors corresponding to speech and text features (e.g., from text BLSTM network 410 and audio BLSTM network 414). As hidden vectors related to speech are less in number compared to the hidden vectors related to text, the word aligned speech vectors are created using the attention layer. Each word aligned speech vector is created as the normalized weighted sum of the speech hidden vectors. These normalized weights act as attentions and are obtained as the weighted combination of the speech and text hidden vectors where the weights/parameters are learned during training. The word aligned speech hidden vectors and text hidden vectors are concatenated and are further processed using a BLSTM network to learn the representations that are optimal for emotion prediction.

The output of the attention layer 416 and the output of the text BLSTM network 410 may be transmitted, as illustrated in FIG. 4B, to the additional BLSTM network 418 to further refine the emotion prediction. The output vector of the additional BLSTM network 418 may then be transmitted to a max-pooling layer 420. The max-pooling layer 420 may be used to reduce the dimension of the hidden vectors obtained from the additional BLSTM network 418 which, in turn, avoids high complexity in the following fully connected network, the complexity depending on the input dimension. The max-pooling layer 420 uses a sliding kernel on the input vector and for each kernel placement, the maximum value is considered in the output vector. Likewise, the output vector is obtained by considering maximum values from the input vector. The output vector may be transmitted to a fully connected layer 422. In the fully connected layer 422, the inputs from one layer are connected to every node of the next layer. The network complexity (number of weights) depends on the input dimension and number of hidden layers. The last layer in the fully connected layer 422 outputs an M-dimensional vector where M is the number categories of emotions that are considered. The M-dimensional vector may be transmitted to a Softmax function 424. Determining an emotion may be treated as a multi-class classification problem. Thus, Softmax activation is used which is a generalization of logistic function to multiple dimensions. The Softmax function 424 takes the M-dimensional vector from the fully connected layer 422 and normalizes it into probability distribution consisting of M probabilities. Thus, the output of the Softmax function 424 consists of values between 0 and 1. The emotion class corresponding to the maximum probability score is considered as a final prediction from the model (e.g., see emotion prediction 426).

The final prediction may be utilized to determine a personalized or next best action at 428. Further, the predicted emotion may be utilized or compiled into training data 430. The training data 430 may be utilized, along with the text and audio, to refine and/or retrain any of the BLSTM networks as described herein.

Such actions or functions, as described in relation to FIGS. 4A and 4B, may be performed, stored in, and/or executed by the circuitry of apparatus 200 and/or the emotion prediction system 102. For example, each BLSTM network in FIGS. 4A and 4B may be stored, as instructions, in memory 204 and/or emotion prediction circuitry 216 and may be utilized by emotion prediction circuitry 216.

Figure 5A:
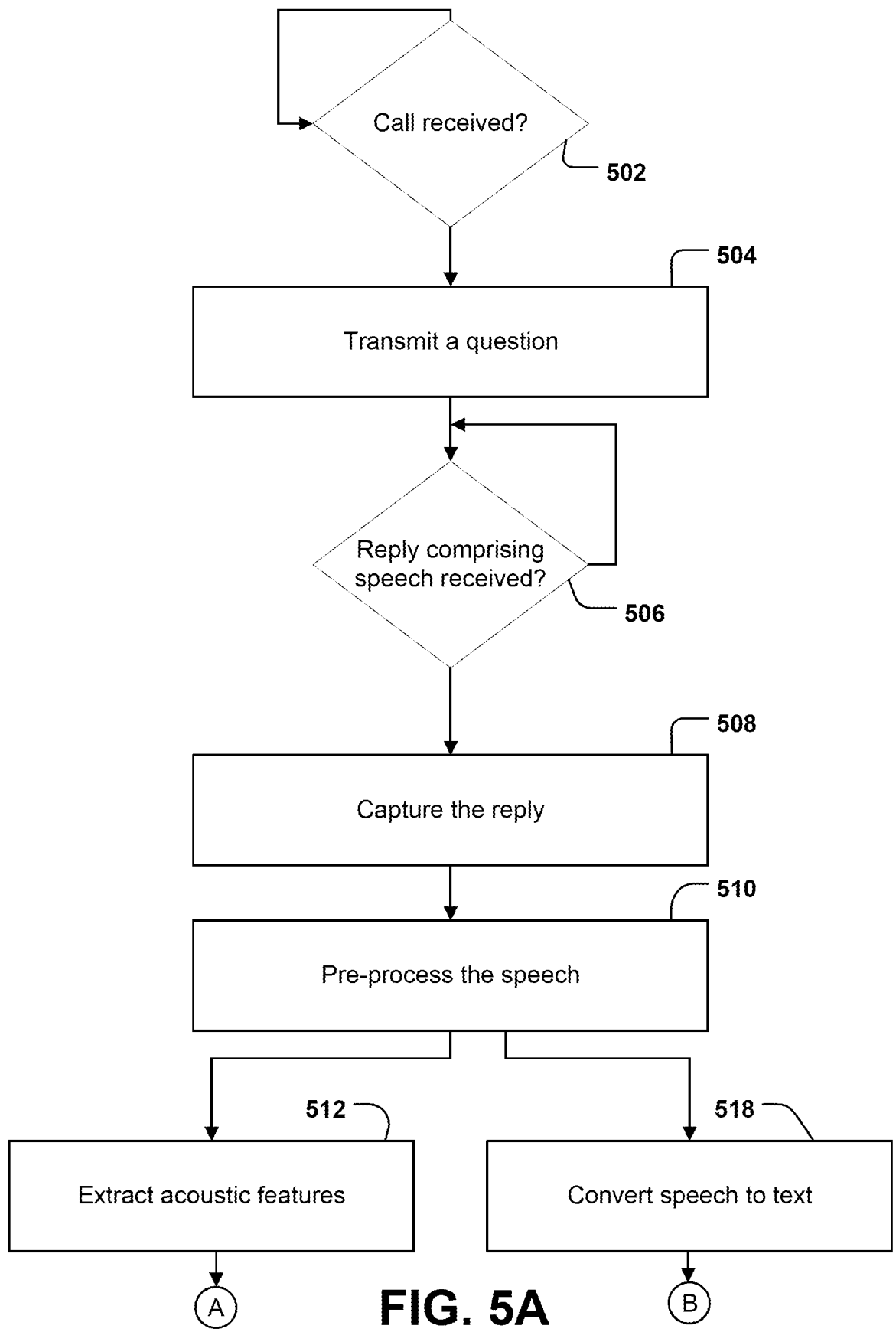
FIGS. 5A, 5B, and 5C illustrate example flowcharts for generating an emotion prediction and determining a next best action or call routing, in accordance with some example embodiments described herein.
Figure 5B:
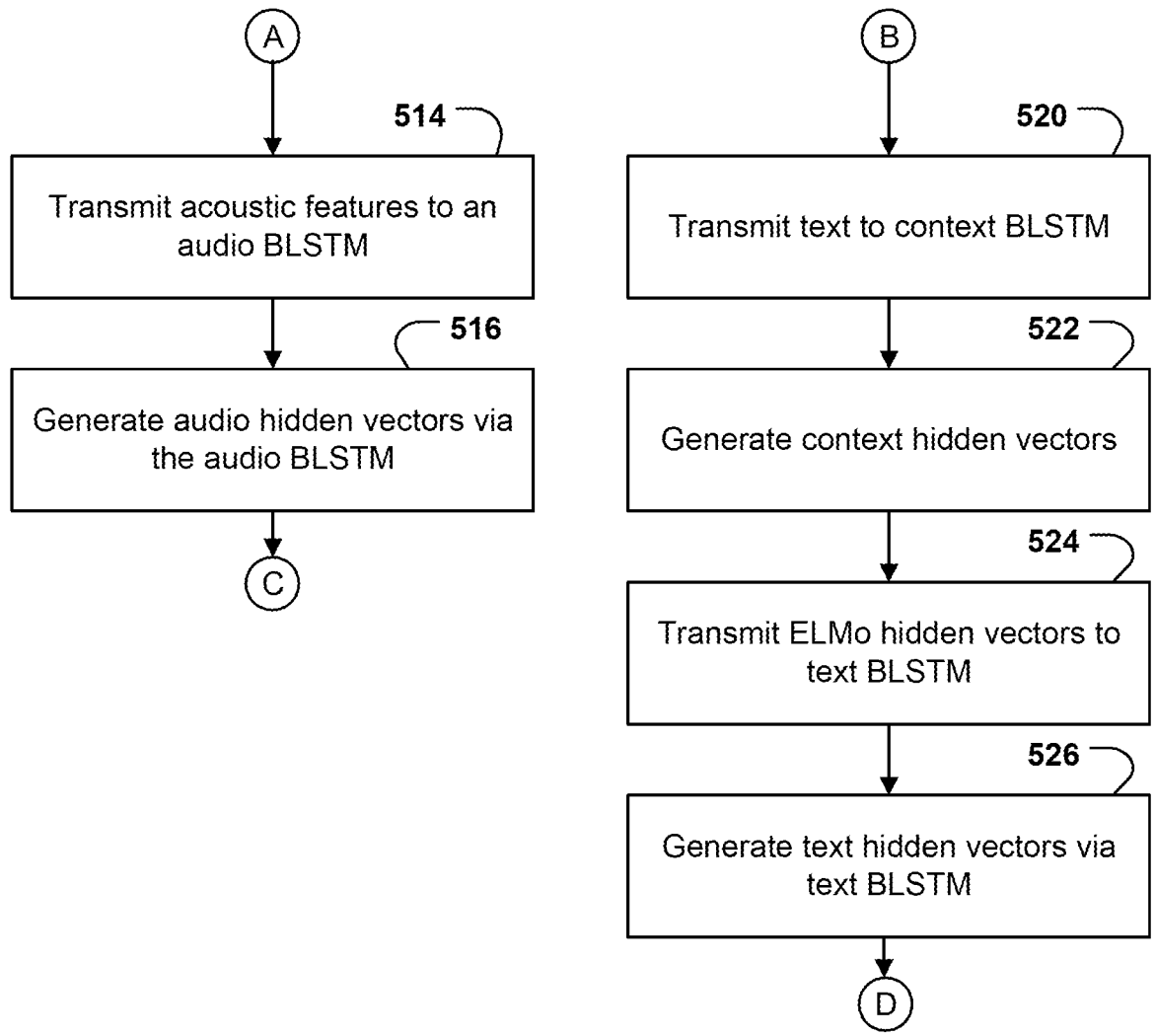
Figure 5C:
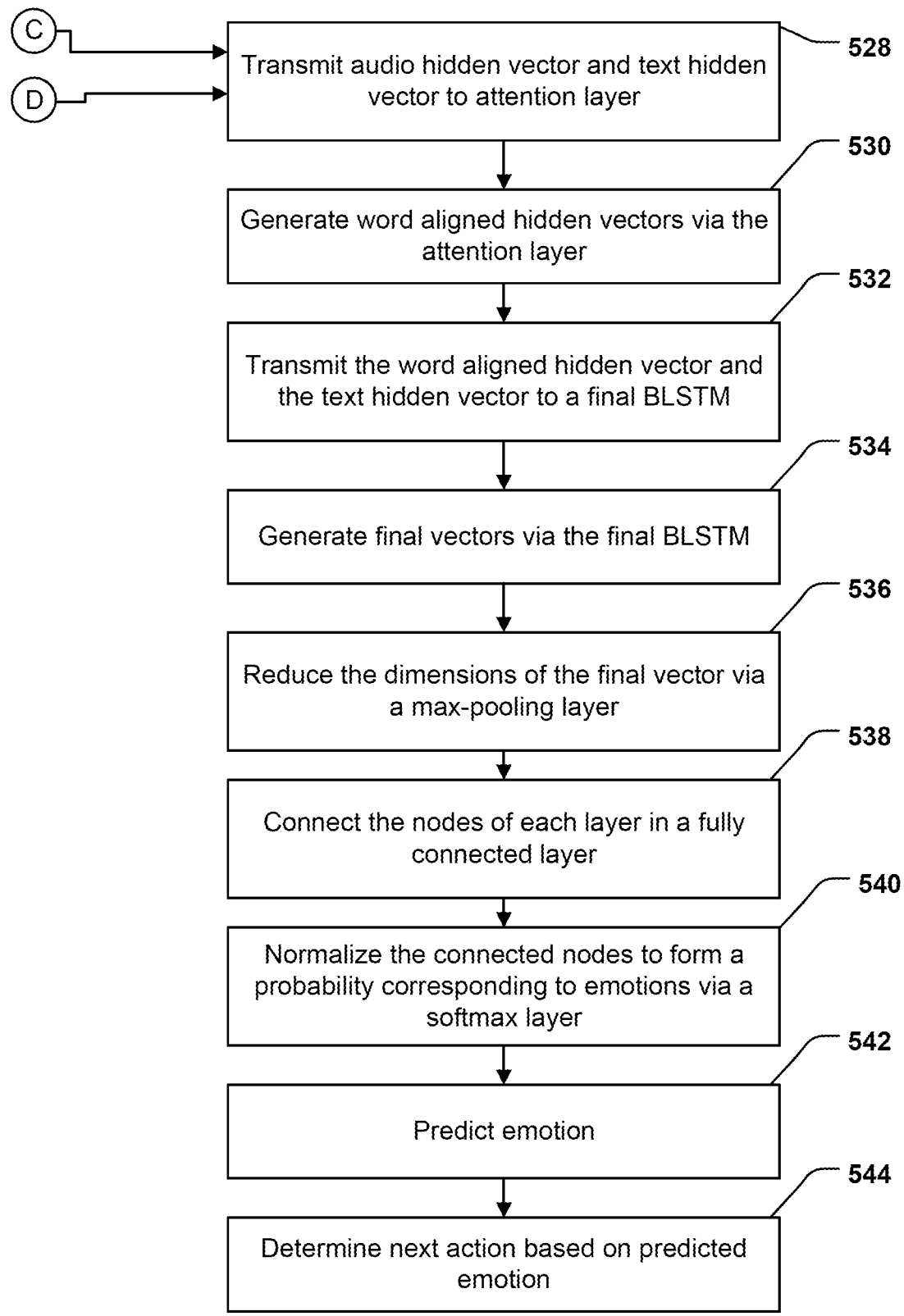

Turning to FIGS. 5A through 5C, example flowcharts are illustrated that contain example operations implemented by example embodiments described herein. The operations illustrated in FIGS. 5A through 5C may, for example, be performed by system device 104 of the emotion prediction system 102 shown in FIG. 1, which may in turn be embodied by an apparatus 200, which is shown and described in connection with FIG. 2. To perform the operations described below, the apparatus 200 may utilize one or more of processor 202, memory 204, communications circuitry 206, input-output circuitry 208, Speech pre-processing circuitry 210, ASR circuitry 212, acoustic feature extraction circuitry 214, emotion prediction circuitry 216, call processing circuitry 218, and/or any combination thereof. It will be understood that user interaction with the emotion prediction system 102 may occur directly via input-output circuitry 208, or may instead be facilitated by a separate IVR 112A-112N, as shown in FIG. 1, and which may have similar or equivalent physical componentry facilitating such user interaction.

As shown by operation 502, the apparatus 200 includes means, such as processor 202, communications circuitry 206, input-output circuitry 208, Speech pre-processing circuitry 210, or the like, for determining whether a call is received. Such a feature may be performed in IVR circuitry or systems, such as any of the IVRs 112A-112N.

As shown by operation 504, the apparatus 200 includes means, such as processor 202, communications circuitry 206, input-output circuitry 208, Speech pre-processing circuitry 210, or the like, for transmitting a question to a caller (e.g., a customer or other user). Such a feature may be performed in IVR circuitry or systems, such as any of the IVRs 112A-112N, or other automated systems. The question may be given to the caller via a voice prompt. The circuitry, automated system, or IVR may prompt the user with a number of different messages, such as "how can I help you" or by asking another, more specific question in response to a previous reply.

As shown by operation 506, the apparatus 200 includes means, such as processor 202, communications circuitry 206, input-output circuitry 208, Speech pre-processing circuitry 210, or the like, for determining whether a reply has been given or is being given in response to the prompt or question. Such a feature may be performed in IVR circuitry or systems, such as any of the IVRs 112A-112N, or other automated systems.

As shown by operation 508, the apparatus 200 includes means, such as processor 202, communications circuitry 206, input-output circuitry 208, Speech pre-processing circuitry 210, or the like, for capturing speech from a customer. Speech or a reply may be captured in response to a determination that a customer has or is beginning to reply. The capture of speech may be performed in response to a customer providing a vocal response to a prompt. As the customer starts speaking, the customer's response may be recorded by, for example, the speech pre-processing circuitry 210 or other circuitry included in apparatus 200. As the customer proceeds through different responses, each segment of speech may be recorded. In another example, the customer may be responding to an agent. In addition to the capture of the customer's speech, the agent's speech may be captured and processed. As such, emotion may be predicted for a customer, an agent, and/or some other user.

As shown by operation 510, the apparatus 200 includes means, such as Speech pre-processing circuitry 210 or the like, for pre-processing the speech. The speech pre-processing circuitry 210 may reduce any noise, background noises, other voices not relevant to the conversation, and/or other anomalies. The speech pre-processing circuitry 210 may reduce noise, background noise, background voices, and/or other noise, by amplifying high frequencies and/or via other denoising techniques as will be understood by those skilled in the art. Further, speech pre-processing circuitry 210 may determine when the speech begins and/or ends (e.g., a speech endpoint). In an embodiment, the speech beginning point and/or end point may be determined (e.g., detected) via the use of different frequencies (e.g., high and low frequencies) and time domains. For example, background noise, which may be at a specific frequency, may be removed. Other background voices may be removed as well. Finally, based on time and the absence of any other frequencies, the speech end point may be determined. In another embodiment, this pre-processing step may break the speech into separate sentences and each sentence may be analyzed as described in greater detail below. From operation 504, the procedure advances both to operation 506, for further processing of acoustic features of the speech, and to operation 512 for further processing of the text elements of the speech.

As shown by operation 512, the apparatus 200 includes means, such as acoustic feature extraction circuitry 214 or the like, for extracting acoustic features. The acoustic feature extraction circuitry 214 may first separate and/or extract acoustic features from the pre-processed speech or audio and then output the acoustic features as an audio vector. Each acoustic feature may exhibit certain qualities useful in determining emotion. The acoustic features may include zero crossing rate, spectral centroid, spectral spread, spectral entropy, spectral flux, spectral roll-off, and/or Mel frequency cepstral coefficients. Zero crossing rate may be the rate of sign changes of the signal during the given speech. The spectral centroid may be the weighted average frequency for a given sub band. The spectral spread may be a measure of average spread of the spectrum in relation to its centroid. The spectral entropy may be an entropy computed based on a probability mass function of normalized spectrum. The spectral flux may be the squared difference between the normalized magnitudes of the successive spectra. The spectral roll-off may be he frequency under which some percentage of the total energy of the spectrum is contained. The Mel frequency cepstral coefficients may be the linear cosine transform of a log power spectrum on a nonlinear Mel scale of frequency. Once one or more of the acoustic features are determined or separated, the one or more acoustic features may be transmitted for further analysis.

As shown by operation 514 and as noted, the apparatus 200 includes means, such as acoustic feature extraction circuitry 214 or the like, for transmitting the one or more acoustic features as an audio vector to an audio BLSTM network.

As shown by operation 516, the apparatus 200 includes means, such as emotion prediction circuitry 216 or the like, for generating audio hidden vectors via an audio BLSTM network. The emotion prediction circuitry 216 may include the audio BLSTM network. The audio BLSTM network may be trained using various prior customer conversations with known emotions. The audio hidden vectors may be a vector or matrix including the acoustic feature, associated speech, and an indicator indicating an emotion. The indicator may be represented by a number, for example, a number between 0 and 1. The emotion prediction circuitry 216 may transmit or feed the audio hidden vectors into an attention layer, as described below in connection with operation 528.

As noted previously, operation 518 may be reached from operation 510 in order to further process text that may be extracted from the speech. As shown by operation 518, the apparatus 200 includes means, such as ASR circuitry 212 or the like, for converting the speech to text. The ASR circuitry 212 may convert a portion or all of a customer's and/or agent's response. In other words, when determining emotion of a customer, the ASR circuitry 212 may convert the customer's speech to text, while when determining emotion of an agent, the ASR circuitry 212 may convert the agent's speech to text. In another embodiment, the ASR circuitry 212 may convert the customer's and agent's speech to text.

As shown by operation 520, the apparatus 200 includes means, such as processor 202, memory 204, communications circuitry 206, emotion prediction circuitry 216, or the like, for transmitting the text may to a context BLSTM network or an ELMo.

As shown by operation 522, the apparatus 200 includes means, such as emotion prediction circuitry 216 or the like, for generating context hidden vectors or ELMo hidden vectors. The emotion prediction circuitry 216 may utilize the context BLSTM network or ELMo to generate a context or ELMo hidden vector for a series of words included in the text. The context BLSTM network or ELMo may be trained with a large text corpus. The context BLSTM network or ELMo may produce a vector distinguishing between different words used by a customer or agent.

As shown by operation 524, the apparatus 200 includes means, such as processor 202, memory 204, communications circuitry 206, emotion prediction circuitry 216, or the like, for the transmission of the context or ELMo hidden vector to a text BLSTM network.

As shown by operation 526, the apparatus 200 includes means, such as emotion prediction circuitry 216 or the like, for generating text hidden vectors via the text BLSTM network. The text BLSTM network may be trained using similar customer calls with known or determined emotions. The text BLSTM network may include a larger training data set, as additional text with determined emotions is available. The emotion prediction circuitry 216 may utilize the text BLSTM network to generate a text hidden vector.

As shown by operation 528, the apparatus 200 includes means, such as processor 202, memory 204, communications circuitry 206, emotion prediction circuitry 216, or the like, for transmitting the audio hidden vector and text hidden vector to an attention layer.

As shown by operation 530, the apparatus 200 includes means, such as emotion prediction circuitry 216 or the like, for generating or determining, via an attention layer, alignment between hidden vectors, thereby forming a word aligned hidden vector. The emotion prediction circuitry 216 may utilize the word aligned hidden vector to predict emotion.

As shown by operation 532, the apparatus 200 includes means, such as processor 202, memory 204, communications circuitry 206, emotion prediction circuitry 216, or the like, for transmitting the word aligned hidden vector and the text hidden vector to a final BLSTM network.

As shown by operation 534, the apparatus 200 includes means, such as emotion prediction circuitry 216 or the like, for generating the final vectors via the final or additional BLSTM network. The emotion prediction circuitry 216 may utilize the final or additional BLSTM network to further refine the final vector prior to final processing and prediction.

As shown by operation 536, the apparatus 200 includes means, such as processor 202, memory 204, communications circuitry 206, emotion prediction circuitry 216, or the like, for reducing the dimensions of the final vector via a max-pooling layer which, in turn, avoids high complexity in the following fully connected network.

As shown by operation 538, the apparatus 200 includes means, such as emotion prediction circuitry 216, or the like, for connecting the nodes of each layer from the max-pooling layer via a fully connected layer to thereby produce an M-dimensional vector, where M is the number categories of emotions that are considered.

As shown by operation 540, the apparatus 200 includes means, such as emotion prediction circuitry 216 or the like, for normalizing the connected nodes to form a probability corresponding to emotions via a Softmax module or layer. The Softmax module or layer takes the M-dimensional vector from the fully connected layer and normalizes it into a probability distribution consisting of M probabilities. Thus, the output of the Softmax module or layer consists of values between 0 and 1.

As shown by operation 542, the apparatus 200 includes means, such as emotion prediction circuitry 216, or the like, for predicting the customer's and/or agent's emotions. The emotion prediction circuitry 216 may determine or predict the customer's and/or agent's emotion based on the output from the Softmax module or layer. For example, a series of the probabilities may be output from the Softmax module or layer for each of the M probabilities. The emotion prediction circuitry 216 may select the emotion with the highest probability as the predicted emotion. In another example, the emotion prediction circuitry 216 may predict emotion based on a combination of the probabilities output from the Softmax module or layer.

As shown by operation 544, the apparatus 200 includes means, such as emotion prediction circuitry 216, call processing circuitry 218, or the like, for determining the next action or best action based on the predicted emotion. The emotion prediction circuitry 216 or call processing circuitry 218 may determine the next action or best action based on the predicted emotion and other factors. Other factors may include, whether the customer is on a call with an IVR or a live agent, a live agent's call handling history, a live agent's rating, a live agent's experience, a live agent's availability, the context of the customer's call (as determined by the context BLSTM network or ELMo), how long a customer has been waiting, and/or a personalized product or service recommendation.

In another embodiment, the operations illustrated in FIGS. 5A and 5B may be an iterative or continuous process. As a customer calls in, the customer may give more than one response in reply to various prompts from an IVR or agent. Further, a customer's emotion may change as a call or interaction progresses. As such, emotion may be predicted at each portion of the customer interaction. Further, the next best action may change after each portion of a conversation, based on the current or most recently predicted emotion, as well as previous predictions for the current call or interaction. Further still, emotions predicted at different times may be weighted differently based on the time of the prediction in relation to the call or interaction. The apparatus 200 includes means, such as the emotion prediction circuitry 216 or call processing circuitry 218, to determine which portion of a call or conversation an emotion is being predicted for, e.g., the beginning, the end, or a portion in between. The emotion prediction circuitry 216 or call processing circuitry 218 may weight the predicted emotion based on the time of the portion of the call. For example, an earlier prediction may be given a higher weight than a later prediction, when determining a next best action. In another example, the later predicted emotion may be given a higher weight than the earlier predicted emotion. Further, weight may be given to emotions based on changes from previous emotions (e.g., from happy to angry).

In addition to the customer's emotion, an agent's emotion may be predicted. The agent's emotion may be utilized to determine the agent's performance or to create a history of emotions in response to particular customer emotions. Such a history may be utilized when determining next best actions for a particular customer call or interaction.

Once the next action or best action has been determined, the call processing circuitry 218 may execute such an action. For example, if the next action is determined to be a re-route of a call from an IVR to a live agent, then the call processing circuitry 218 may transfer the call based on that determined next action.

As described above, example embodiments provide methods and apparatuses that enable improved emotion prediction and call resolution. Example embodiments thus provide tools that overcome the problems faced by typical emotion prediction systems. By utilizing text and audio vectors, a more accurate emotion prediction may be made. Moreover, embodiments described herein avoid less accurate predictions. The use of multiple machine learning algorithms, in particular BLSTM networks, provide for a more accurate prediction, ensuring a customer's call is resolved.

As these examples all illustrate, example embodiments contemplated herein provide technical solutions that solve real-world problems faced during customer calls with customers exhibiting anger or otherwise unsatisfactory emotions. And while customer satisfaction has been an issue for decades, the introduction of IVRs has introduced longer wait times and further frustrated customers, as navigation takes time and does not always result in proper call routing. As the demand for faster resolution times and customer satisfaction significantly grows, a solution to resolve this issue does not exist. At the same time, the recently arising ubiquity of speech capture and machine learning has unlocked new avenues to solving this problem that historically were not available, and example embodiments described herein thus represent a technical solution to these real-world problems.

FIGS. 5A through 5C illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for predicting an emotion based on speech and text derived from the speech, the method comprising:
    receiving, by communications circuitry, a reply comprising speech, wherein the reply comprises a portion of a total reply;
    extracting, by acoustic feature extraction circuitry, one or more acoustic features from each portion of the total reply comprising the speech;
    causing, by emotion prediction circuitry, generation of audio hidden vectors using the one or more acoustic features and an audio Bidirectional Long Short-Term Memory (BLSTM) network;
    converting, via automatic speech recognition circuitry, the speech for each portion of the total reply to text;
    causing, by the emotion prediction circuitry, generation of context hidden vectors using the text and a speech-context BLSTM;
    causing, by the emotion prediction circuitry, generation of text hidden vectors using the context hidden vectors and a text BLSTM network;
    causing, by the emotion prediction circuitry, generation of word aligned hidden vectors using the audio hidden vectors, the text hidden vectors, and an attention layer;
    causing, by the emotion prediction circuitry, generation of hidden vectors using the word aligned hidden vectors, the text hidden vectors, and a final BLSTM network;
    reducing, via a max-pooling layer, dimensionality of the hidden vectors to generate reduced dimensionality hidden vectors;

causing, by the emotion prediction circuitry, generation of an emotion vector for each portion of the total reply using the reduced dimensionality hidden vectors and a fully connected layer;

normalizing, via a Softmax layer, the emotion vector for each portion of the total reply to form one or more probabilities corresponding to one or more emotions, wherein early portions of the total reply, in relation to time, are weighted higher than later portions of the total reply;

calculating, via the Softmax layer, a probability distribution based on the one or more probabilities corresponding to the one or more emotions; and determining, by the emotion prediction circuitry, a predicted emotion and next action based on the probability distribution.

2. The method of claim 1, wherein the total reply comprises speech in response to a prompt from interactive voice response system during a customer call.

3. The method of claim 2, further comprising:
re-directing, via call processing circuitry, the customer call to one of one or more live agents based on the next action.

4. The method of claim 3, further comprising:
prior to re-direction of the customer call, identifying, via the call processing circuitry, the one or more live agents and a call handling history corresponding to each of the one or more live agents.

5. The method of claim 4, wherein the call handling history comprises one or more of a live agent's ranking corresponding to particular emotions, a live agent's rating from customers and the customers corresponding predicted emotions at a time of the rating, and a live agent's experience.

6. The method of claim 5, wherein the re-direction of the customer call is further based on the predicted emotion and the call handling history corresponding to each of the one or more live agents.

7. The method of claim 1, wherein the next action is further based on the predicted emotion for each portion of the total reply in real-time.

8. The method of claim 7, wherein the predicted emotion for each portion of the total reply is weighted based on a time of a portion of the total reply.

9. The method of claim 8, wherein later portions of the total reply, in relation to time, are weighted higher than early portions of the total reply, in relation to time.

10. The method of claim 1, wherein the determination of the next action is further based on a customer's call history.

11. The method of claim 10, wherein the determination of the next action is further based on a customer's emotion history.

12. The method of claim 1, further comprising:
prior to extraction of the one or more acoustic features from the speech, pre-processing, by speech pre-processing circuitry, the speech.

13. The method of claim 1, wherein the emotion vector is of a size determined by a number of emotions considered.

14. The method of claim 1, wherein the predicted emotion comprises a numeric value indicating an emotion.

15. The method of claim 1, wherein the one or more acoustic features comprise one or more of zero crossing rate, spectral centroid, spectral spread, spectral entropy, spectral flux, spectral roll-off, and Mel frequency cepstral coefficients.

16. The method of claim 1, wherein the next action includes providing one or more of personalized product recommendations and personalized service recommendations.

17. An apparatus for predicting an emotion based on speech and text derived from the speech, the apparatus comprising:
communications circuitry configured to receive a reply comprising speech, wherein the reply comprises a portion of a total reply;
acoustic feature extraction circuitry configured to extract one or more acoustic features from each portion of the total reply comprising the speech;
automatic speech recognition circuitry configured to convert the speech for each portion of the total reply to text; and
emotion prediction circuitry configured to:
cause, via an audio BLSTM, generation of audio hidden vectors based on the one or more acoustic features of the total reply,
cause, via a context BLSTM network, generation of context hidden vectors based on the text,
cause, via a text BLSTM network, generation of text hidden vectors based on the context hidden vectors,
cause, via an attention layer, generation of word aligned hidden vectors using the audio hidden vectors and the text hidden vectors,
cause, via a final BLSTM network, generation of hidden vectors based on the text hidden vectors and the word aligned hidden vectors,
reduce, via a max-pooling layer, dimensionality of the hidden vectors to generate reduced dimensionality hidden vectors,
cause, via a fully connected layer, generation of an emotion vector for each portion of the total reply using the reduced dimensionality hidden vectors,
normalize, via a Softmax layer, the emotion vector for each portion of the total reply to form one or more probabilities corresponding to one or more emotions, wherein early portions of the total reply, in relation to time, are weighted higher than later portions of the total reply,
calculate, via the Softmax layer, a probability distribution based on the one or more probabilities corresponding to the one or more emotions, and
determine a predicted emotion and next action based on the probability distribution.

18. The apparatus of claim 17, wherein the one or more acoustic features comprise one or more of zero crossing rate, spectral centroid, spectral spread, spectral entropy, spectral flux, spectral roll-off, and Mel frequency cepstral coefficients.

19. The apparatus of claim 17, wherein the next action comprises one or more of re-direction to a live agent, re-direction to a live agent in a particular group, re-direction to a specified live-agent, product suggestions, service suggestion, another IVR menu, and issue resolution and wherein a call processing circuitry is configured to perform the next action.

20. The apparatus of claim 17, wherein the context BLSTM network comprises an Embeddings from Language Models (ELMo).

21. A computer program product for predicting a customer's emotions, the computer program product comprising at least one non-transitory computer-readable storage medium storing software instructions that, when executed, cause an apparatus to:

in response to a reply, capture speech, wherein the reply comprises a portion of a total reply;

extract one or more acoustic features from each portion of the total reply comprising the speech;

cause, via an audio Bidirectional Long Short-Term Memory (BLSTM) network, generation of audio hidden vectors based on the one or more acoustic features;

convert the speech for each portion of the total reply to text;

cause, via a speech-context BLSTM, generation of context hidden vectors based on the text;

cause, via a text BLSTM network, generation of text hidden vectors based on the context hidden vectors;

cause, via an attention layer, generation of word aligned hidden vectors based on audio hidden vectors and text hidden vectors;

cause, via a final BLSTM network, generation of hidden vectors based on word aligned hidden vectors and the text hidden vectors;

reduce, via a max-pooling layer, dimensionality of the hidden vectors to generate reduced dimensionality hidden vectors;

cause, via a fully connected layer, generation of an emotion vector for each portion of the total reply using the reduced dimensionality hidden vectors;

normalize, via a Softmax layer, the emotion vector for each portion of the total reply to form one or more probabilities corresponding to one or more emotions, wherein early portions of the total reply, in relation to time, are weighted higher than later portions of the total reply;

calculate, via the Softmax layer, a probability distribution based on the one or more probabilities corresponding to the one or more emotions; and determine a predicted emotion and next action based on the one or more probabilities.

22. The computer program product of claim 21, wherein the speech is captured from one or more of a customer and an agent.

23. The computer program product of claim 21, wherein the one or more acoustic features comprise one or more of zero crossing rate, spectral centroid, spectral spread, spectral entropy, spectral flux, spectral roll-off, and Mel frequency cepstral coefficients.

24. The computer program product of claim 21, wherein the speech-context BLSTM network comprises an Embeddings from Language Models (ELMo).

* * * * *